United States Patent
Jiang et al.

(10) Patent No.: US 9,525,723 B2
(45) Date of Patent: *Dec. 20, 2016

(54) SYSTEMS AND METHODS FOR RETRIEVING CUSTOMER PREMISE EQUIPMENT DATA

(71) Applicant: AT&T Intellectual Property I, L.P., Atlanta, GA (US)

(72) Inventors: Baofeng Jiang, Pleasanton, CA (US); Kaiyan Chen, Pleasanton, CA (US); Michael Yew-Aik Lim, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/561,498

(22) Filed: Dec. 5, 2014

(65) Prior Publication Data

US 2015/0081844 A1 Mar. 19, 2015

Related U.S. Application Data

(63) Continuation of application No. 13/534,187, filed on Jun. 27, 2012, now Pat. No. 8,935,391, which is a
(Continued)

(51) Int. Cl.
*G06F 15/16* (2006.01)
*G06F 15/177* (2006.01)
(Continued)

(52) U.S. Cl.
CPC ........... *H04L 67/10* (2013.01); *H04L 12/2859* (2013.01); *H04L 12/2898* (2013.01); *H04L 41/50* (2013.01);
(Continued)

(58) Field of Classification Search
CPC ............. H04L 41/0806; H04L 41/0809; H04L 41/0866
(Continued)

(56) References Cited

U.S. PATENT DOCUMENTS 5,915,008 A 6/1999 Dulman
6,839,355 B1 1/2005 Saby et al.
(Continued)

OTHER PUBLICATIONS

Bernstein, J. et al., "CPE WAN Management Protocol", Technical Report, DSL Forum TR-069, May 2004, DSLHome-Technical Working Group, pp. 1-109.

*Primary Examiner* — Hieu Hoang
(74) *Attorney, Agent, or Firm* — Toler Law Group, PC

(57) ABSTRACT

A method includes detecting, at a customer premise equipment management system, a trigger event associated with customer premise equipment data, the customer premise equipment data associated with a customer premise equipment device. The method also includes initiating a connection to the customer premise equipment device via an application program interface in response to the trigger event, where the application program interface is selected based on the customer premise equipment data. The method further includes sending, from the customer premise equipment management system, a customer premise equipment data request to the customer premise equipment device via the application program interface.

20 Claims, 5 Drawing Sheets

Related U.S. Application Data continuation of application No. 11/729,682, filed on Mar. 29, 2007, now Pat. No. 8,250,190.

(51) Int. Cl.
  *G06F 15/173* (2006.01)
  *H04L 29/08* (2006.01)
  *H04L 12/28* (2006.01)
  *H04L 12/24* (2006.01)
  *H04M 7/00* (2006.01)
  *H04W 4/00* (2009.01)
  *H04W 76/02* (2009.01)

(52) U.S. Cl.
  CPC ........ *H04L 41/0806* (2013.01); *H04L 41/0809* (2013.01); *H04L 41/0866* (2013.01); *H04M 7/0069* (2013.01); *H04W 4/00* (2013.01); *H04W 76/02* (2013.01)

(58) Field of Classification Search
  USPC ................................. 709/217, 220, 222, 223
  See application file for complete search history.

(56) References Cited

U.S. PATENT DOCUMENTS

| | | |
|---|---|---|
| 6,931,018 B1 | 8/2005 | Fisher |
| 7,352,853 B1 | 4/2008 | Shen et al. |
| 7,522,904 B1 | 4/2009 | Zhu |
| 7,535,966 B2 | 5/2009 | Rhee et al. |
| 8,370,818 B2 | 2/2013 | Osminer et al. |
| 2002/0095484 A1 | 7/2002 | Pagani et al. |
| 2004/0034685 A1 | 2/2004 | Suzuki et al. |
| 2005/0108348 A1 | 5/2005 | Lee |
| 2005/0111398 A1 | 5/2005 | Wybenga et al. |
| 2005/0223069 A1 | 10/2005 | Cooperman et al. |
| 2006/0072470 A1 | 4/2006 | Moore et al. |
| 2006/0198430 A1 | 9/2006 | Rhee et al. |
| 2007/0162928 A1 | 7/2007 | Mickle et al. |
| 2007/0204022 A1 | 8/2007 | Hsu et al. |
| 2007/0204300 A1* | 8/2007 | Markley et al. ............... 725/46 |
| 2007/0217492 A1 | 9/2007 | Cox et al. |
| 2007/0283194 A1 | 12/2007 | Villella et al. |
| 2008/0010358 A1 | 1/2008 | Jin |
| 2008/0016540 A1 | 1/2008 | Savoor et al. |
| 2008/0066113 A1 | 3/2008 | Skelly |
| 2008/0134156 A1 | 6/2008 | Osminer et al. |
| 2008/0134165 A1 | 6/2008 | Anderson et al. |
| 2008/0162161 A1 | 7/2008 | Mamakos |
| 2008/0192820 A1 | 8/2008 | Brooks et al. |
| 2008/0240089 A1 | 10/2008 | Jiang et al. |
| 2009/0158362 A1 | 6/2009 | Kajos |

\* cited by examiner

SYSTEMS AND METHODS FOR RETRIEVING CUSTOMER PREMISE EQUIPMENT DATA

PRIORITY CLAIM

This application is a continuation of, and claims priority to, U.S. patent application Ser. No. 13/534,187, filed on Jun. 27, 2012, which is a continuation of, and claims priority to, U.S. patent application Ser. No. 11/729,682, filed on Mar. 29, 2007, now issued as U.S. Pat. No. 8,250,190, which are hereby incorporated by reference in their entirety.

FIELD OF THE DISCLOSURE

The disclosure generally relates to customer premise equipment and more particularly to systems and methods for retrieving customer premise equipment data.

BACKGROUND

Service providers routinely install customer premise equipment (CPE) devices at individual customer locations to facilitate the providing of services. Examples of such service providers include, but are not limited to, Internet service providers, telephone service providers, and cable service providers. CPE devices often store CPE device specific data including, but not limited to, wide area network (WAN) data and local area network (LAN) data. The WAN data stored in a CPE device typically relates to WAN level activity between the CPE device and the service provider. Examples of the types of WAN data that may be stored in a CPE device include, but are not limited to, CPE WAN performance statistics and CPE WAN usage parameters. The LAN data stored in a CPE device typically relates to customer location specific activity relating to the use of service provider services. Examples of the types of LAN data that may be stored in a CPE device include, but are not limited to, LAN performance parameters, LAN usage parameters, LAN performance statistics, and service provider service usage statistics. Providing access to the data stored in individual CPE devices may enable a service provider to, for example, evaluate WAN performance parameters at a CPE device level, evaluate customer specific LAN performance parameters, analyze customer usage patterns, develop customer specific marketing strategies, implement customer specific maintenance procedures and/or implement customer specific trouble shooting procedures.

DETAILED DESCRIPTION

Figure 1:
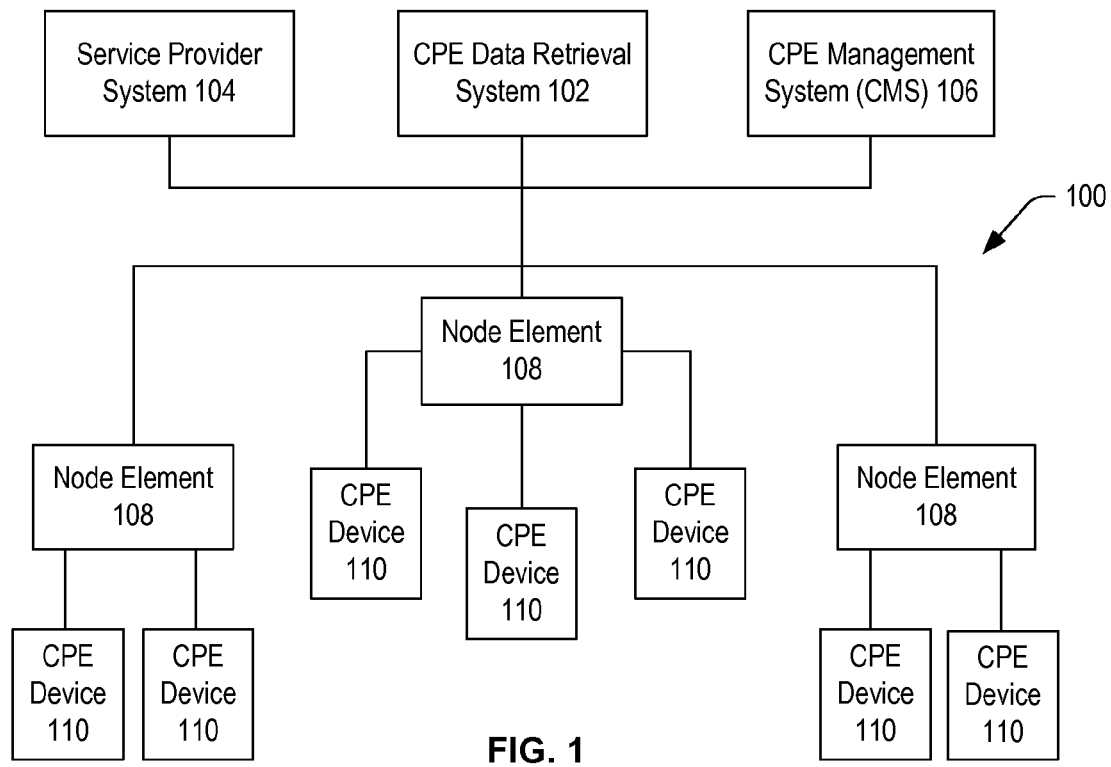
FIG. 1 is a schematic block diagram of an example of a network system including one embodiment of a CPE data retrieval system.

Referring to FIG. 1, a schematic block diagram of a network system 100 including one embodiment of a customer premise equipment (CPE) data retrieval system 102 is shown. The network system 100 generally includes a service provider system 104, a CPE data retrieval system 102, a CPE management system (CMS) 106, one or more node elements 108, and a plurality of CPE devices 110.

In one embodiment, the service provider system 104, the CPE data retrieval system 102, and the CMS 106 are communicatively coupled via an Intranet network. In one embodiment, the service provider 104, the CPE data retrieval system 102, and the CMS 106 are communicatively coupled via an Internet network. In one embodiment, the service provider system 104, the CPE data retrieval system 102, and the CMS 106 are communicatively coupled via a combination of an Internet network and an Intranet network. In one embodiment, the service provider system 104 includes the CMS 106 as an integrated component of the service provider system 104. In one embodiment, the service provider system 104 includes the CPE data retrieval system 102 as an integrated component of the service provider system 104. In one embodiment, the service provider system 104 includes both the CMS 106 and the CPE data retrieval system 102 as integrated components of the system provider system 104.

The service provider system 104, the CPE data retrieval system 102, and the CMS 106 are communicatively coupled to each of the node elements 108. In one embodiment, each of the service provider system 104, the CPE data retrieval system 102, and the CMS 106 are communicatively coupled to each of the node elements 108 via an Internet network system. Each of the node elements 108 are communicatively coupled to one or more CPE devices 110. In one embodiment, each of the node elements are communicatively coupled to one or more CPE devices 110 via an Internet network. A node element 108 generally routes data to and from one or more CPE devices 110 associated with the node element 108 within the network system 100. In one embodiment, the node elements 108 route data exchanges between the CPE devices 110 and one or more of the service provider system 104, the CPE data retrieval system 102, and the CMS 106.

A CPE device 110 is installed at each service provider customer location. The service provider system 104 provides one or more services to a service provider customer via the installed CPE device 110. Examples of services provided by the service provider system 104 include, but are not limited to, telephone services, cable services, and Internet services. Examples of CPE devices 110 include, but are not limited to, ADSL modems, set-top boxes, and residential gateways. Each CPE device 110 stores CPE specific data. The types of CPE specific data stored in the CPE device 110 include, but are not limited to, CPE wide area network (WAN) data and local area network (LAN) data. The LAN is a customer location network communicatively coupled to the CPE device 110.

CPE WAN data includes CPE data parameters relating to WAN level activity between the CPE device 110 and the network system 100. Examples of CPE WAN data include, but are not limited to, CPE WAN performance parameters, CPE WAN performance statistics, CPE WAN usage parameters, CPE downstream Dynamic Spectrum Management (DSM) statistics, CPE upstream/downstream WAN usage, and CPE upstream/downstream performance statistics. LAN data includes CPE data parameters associated with customer location specific activity relating to the use of services provided by the service provider. Examples of LAN data parameters include, but are not limited to, LAN performance parameters, LAN usage parameters, LAN performance statistics, and service provider service usage statistics.

The CMS 106 generally manages and stores CPE device specific CPE access data for each of the CPE devices 110 under the management of the CMS 106. In one embodiment, the CMS 106 manages and stores CPE access data for CPE devices 110 associated with a single service provider. In one embodiment, the CMS 106 manages and stores CPE access data for CPE devices 110 associated with a number of different service providers. In one embodiment, the CPE access data stored by the CMS 106 includes a CPE identification tag and a CPE access certificate for each of the CPE devices 110. In one embodiment, the CPE access data stored by the CMS 106 includes a CPE identification tag, a CPE access certificate, and a CPE type for each of the CPE devices 110.

In one embodiment, the CPE data retrieval system 102 coordinates the retrieval of selected CPE data from one or more selected CPE devices 110. In one embodiment, the CPE data retrieval system 102 coordinates a bulk download of CPE data from one or more selected CPE devices 110. In one embodiment, the CPE data retrieval system 102 coordinates a periodic retrieval of selected CPE data from one or more selected CPE devices 110. In one embodiment, the CPE data retrieval system 102 coordinates a periodic bulk download of CPE data from one or more selected CPE devices 110.

In one embodiment, the selected CPE devices 110 consist of the CPE devices 110 under the management of the CPE data retrieval system 102. In one embodiment, the selected CPE devices 110 consist of the CPE devices 110 under the management of the CPE data retrieval system 102 that are associated with a specific service provider. In one embodiment, the one or more selected CPE devices 110 consist of one or more CPE devices 110 undergoing a trouble shooting procedure. In one embodiment, the one or more selected CPE devices 110 consist of one or more CPE devices 110 selected for a maintenance procedure.

Figure 2:
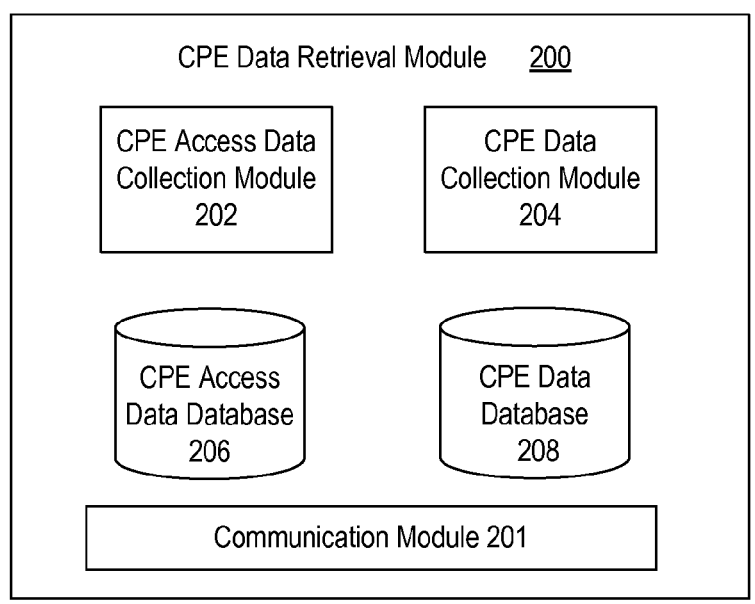
FIG. 2 is a block diagram of one embodiment of a CPE data retrieval module.

Referring to FIG. 2, a block diagram of one embodiment of a CPE data retrieval module 200 is shown. The CPE data retrieval system 102 includes a CPE data retrieval module 200. The CPE data retrieval module 200 generally coordinates the retrieval and storage of CPE data from one or more selected CPE devices 110. One embodiment of the CPE data retrieval module 200 generally includes a communication module 201, a CPE access data collection module 202, a CPE data collection module 204, a CPE access data database 206, and a CPE data database 208.

The communication module 201 generally coordinates communications between the CPE data retrieval system 102 and one or more of the service provider system 104, the CMS 106, and one or more selected CPE devices 110. In one embodiment, the communication module 201 establishes communication channels between the CPE data retrieval system 102 and one or more of the service provider system 104, the CMS 106, and one or more selected CPE devices 110 responsive to requests received from the CPE access data collection module 202 and/or the CPE data collection module 204.

The CPE access data collection module 202 manages the collection and storage of CPE access data. As mentioned previously, the CMS 106 stores CPE access data for each of the CPE devices 110 under the management of the CMS 106. During the initialization of the CPE data retrieval system 102, the CPE access data collection module 202 coordinates the collection of the CPE access data for the CPE devices 110 associated with the CPE data retrieval system 102 from the CMS 106.

In one embodiment, the set of CPE devices 110 associated with the CPE data retrieval system 102 are the same set of CPE devices 110 under the management of the CMS 106. In one embodiment, the CPE devices 110 associated with the CPE data retrieval system 102 are affiliated with a specific service provider while the CMS 106 manages CPE devices 110 for multiple service providers. In one embodiment, the CPE devices 110 associated with the CPE data retrieval system 102 are affiliated with a specific segment of a service provider network.

Figure 3:
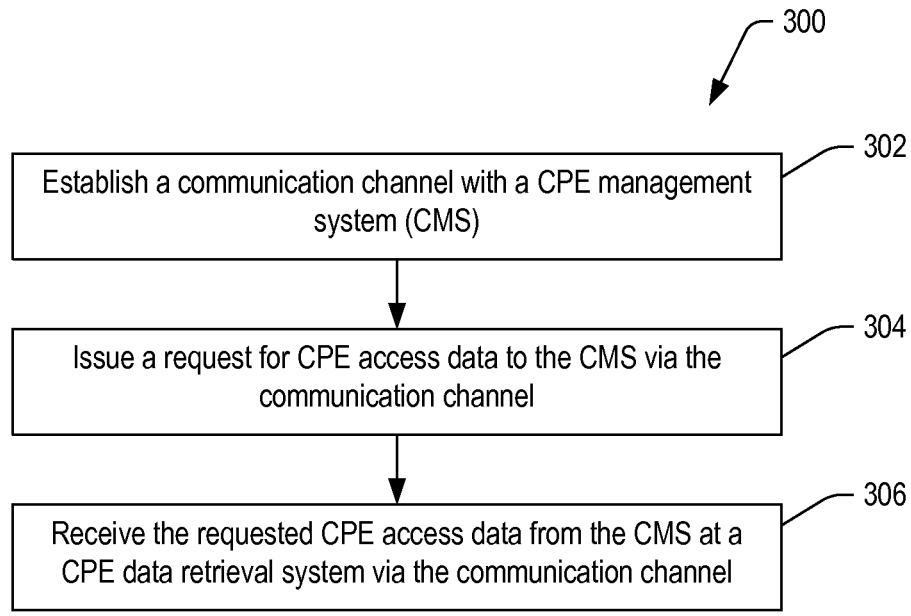
FIG. 3 is a flow chart of one embodiment of a method of collecting CPE access data from a CMS.

Referring to FIG. 3, a flow chart of one embodiment of a method 300 of collecting CPE access data is shown. A communication channel is established with a CMS 106 at step 302. In one embodiment, the CPE access data collection module 202 issues a command to the communication module 201 to establish a communication channel between the CPE data retrieval system 102 and the CMS 106. The communication module 201 responsively establishes a communication channel between the CPE data retrieval system 102 and the CMS 106. A request for CPE access data is issued to the CMS 106 via the communication channel at step 304. In one embodiment, the CPE access data collection module 202 issues a request for CPE access data to the CMS 106. In one embodiment, the CPE access data collection module 202 issues a request for CPE access data for the CPE devices 110 associated with the CPE data retrieval system 102. In one embodiment, the CPE access data collection module 202 issues a request for CPE access data for one or more selected CPE devices 110. The requested CPE access data is received from the CMS 106 at the CPE data retrieval system via the communication channel at step 306. In one embodiment, the CPE access data collection module 202 stores the received CPE access data in the CPE access data database 206. While the steps in the method 300 have been described in a particular order, the described steps may be performed in a different order, a subset of the described steps may be performed, or additional steps may be performed in addition to the described steps.

Figure 4:
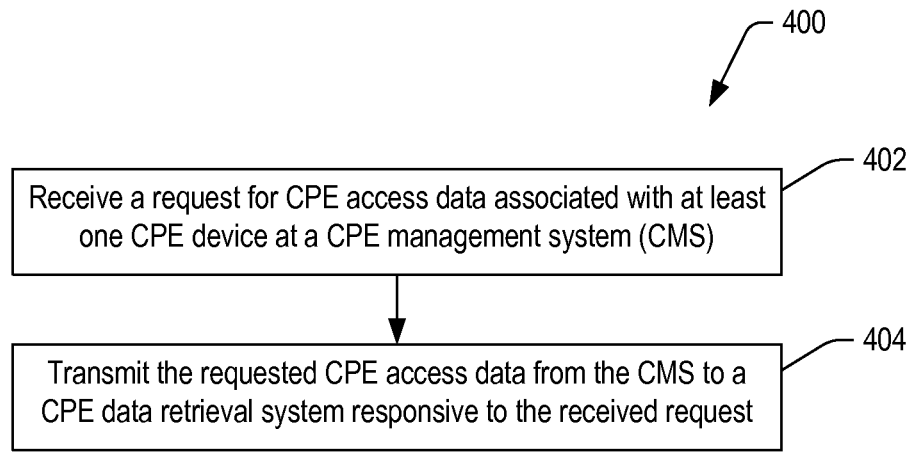
FIG. 4 a flow chart of one embodiment of a method of providing requested CPE access data from a CMS to a CPE data retrieval system.

Referring to FIG. 4 a flow chart of one embodiment of a method 400 of providing requested CPE access data from a CMS 106 to a CPE data retrieval system 102 is shown. A request for CPE access data associated with at least one CPE device 110 is received at a CMS 106 at step 402. In one embodiment, the CMS 106 receives a request for CPE access data for the CPE devices 110 associated with the CPE data retrieval system 102. In one embodiment, the CMS 106 receives a request for CPE access data for one or more selected CPE devices 110. The requested CPE access data is transmitted from the CMS 106 to the CPE data retrieval system 102 responsive to the received request at step 402. While the steps in the method 400 have been described in a particular order, the described steps may be performed in a different order, a subset of the described steps may be performed, or additional steps may be performed in addition to the described steps.

Referring back to FIG. 2, as additional CPE devices 110 are placed under the management of the CPE data retrieval system 102, the CPE access data collection module 202 manages the collection and storage of the CPE access data for the newly added CPE devices 110. In one embodiment, the CPE access data collection module 202 periodically requests the CPE access data for newly added CPE devices 110 from the CMS 106. In one embodiment, the CPE data retrieval system 102 automatically receives the CPE access data from a newly added CPE device 110 during the activation of the new CPE device 110. Upon receipt of CPE access data, the CPE access data collection module 202 stores the received CPE access data in the CPE access data database 206.

In one embodiment, the CPE access data collection module 202 retrieves CPE access data for one or more selected CPE devices 110 from the CMS 106 on an ad hoc basis. When the CPE data retrieval system 102 selects one or more CPE devices 110 for CPE data retrieval, the CPE access data collection module 202 issues a request for the CPE access data for the one or more selected CPE devices 110 to the CMS 106. The CPE access data collection module 202 forwards the received CPE access data to the CPE data collection module 204.

The CPE data collection module 204 generally coordinates the retrieval and storage of CPE data from one or more selected CPE devices 110 responsive to a trigger event. The trigger event defines the one or more CPE devices 110 selected for CPE data retrieval. In one embodiment, the trigger event is a request from the service provider system 104 for one or more selected CPE data parameters from one or more selected CPE devices 110. In one embodiment, the trigger event is a request initiated by the CPE data retrieval system 102 for the retrieval of one or more selected CPE data parameters from one or more selected CPE devices 110. In one embodiment, the trigger event is a request initiated by the CPE data retrieval system 102 for a bulk download of CPE data stored in one or more selected CPE devices 110. In one embodiment, the trigger event is a request initiated by the CPE data retrieval system 102 for a bulk download of CPE data stored in the CPE devices 110 under the management of the CPE data retrieval system 102. In one embodiment the request for CPE data issued by the CPE data retrieval system 102 is initiated on a periodic basis. In one embodiment, the request for CPE data issued by the CPE data retrieval system 102 is initiated approximately every twenty-four hours. Responsive to the trigger event, the CPE data collection module 204 retrieves the CPE access data for the one or more selected CPE devices 110 from the CPE access data database 206.

In one embodiment, the retrieved CPE access data includes the CPE identification tag, the CPE access certificate, and the CPE type for each of the one or more selected CPE devices 110. Different types of CPE devices 110 may be supported by different application program interfaces (API) thereby requiring different access mechanisms. The CPE data collection module 202 uses the CPE type for each of the one or more selected CPE devices 110 to identify the specific API supported by each of the one or more selected CPE devices 110 and to determine the appropriate access mechanisms for each of the one or more selected CPE devices 110. The CPE data retrieval system 102 uses the CPE identification tag to address the CPE device 110 identified by the CPE identification tag. The CPE data retrieval system 102 uses the CPE access certificate to provide the authorization necessary to gain access to the CPE data stored in the associated CPE device 110.

When a single CPE device 110 is selected for CPE data retrieval, the CPE data collection module 204 issues a command to the communication module 201 to establish a communication channel between the CPE data retrieval system 102 and the selected CPE device 110 using the CPE identification tag, CPE specific access mechanism, and the CPE access certificate for that CPE device 110. The communication channel is established via the node element 108 associated with the selected CPE device 110 within the Internet network. The trigger event defines the CPE data parameters selected for retrieval. The CPE data collection module 204 issues a request for the selected CPE data parameters to the selected CPE device 110. The selected CPE device 110 responsively retrieves the requested one or more CPE data parameters from a CPE memory and transmits the requested one or more CPE data parameters from the CPE device 110 to the CPE data retrieval system 102. The CPE data collection module 204 stores the received CPE data in the CPE data database 206. In cases, where the CPE data is requested by a service provider, the retrieved CPE data is forwarded to the service provider system 104.

In one embodiment, when multiple CPE devices 110 are selected for CPE data retrieval, the CPE data collection module 204 issues a command to the communication module 201 to establish individual communication channels with each of the multiple CPE devices 110 using the CPE identification tags, the CPE access mechanisms, and the CPE access certificates for each of the selected CPE devices 110. In one embodiment, the CPE data collection module 204 issues a command to the communication module 201 to simultaneously establish multiple parallel communication channels between the CPE data retrieval system 102 and each of the selected CPE devices 110. Each of the parallel communication channels are established between the CPE data retrieval system 102 and each one of the selected CPE devices 110 via the node element associated with each of the selected CPE devices 110 within the Internet network. In one embodiment, the CPE data retrieval system 102 issues requests for the selected CPE data parameters to each of the selected CPE devices 110 via the established communication channels. In one embodiment, the CPE data retrieval system 102 simultaneously issues parallel requests for the selected CPE data parameters to each of the selected CPE devices 110 via the established communication channels. Each of the selected CPE devices 110 responsively retrieves the requested CPE data from CPE memory and transmits the requested CPE data parameters from the CPE device 110 to the CPE data retrieval system 102. The CPE data collection module 204 stores the received CPE data in the CPE data database 206. In cases, where the CPE data is requested by a service provider, the retrieved CPE data is forwarded to the service provider system 104.

In one embodiment, the trigger event is a request for a bulk download of CPE data from each of the plurality of CPE devices 110 associated with the CPE data retrieval system 102. In one embodiment, the request for the bulk download of CPE data from each of the plurality of CPE devices 110 is initiated by the CPE data retrieval system 102. In one embodiment, the request for the bulk download of CPE data from each of the plurality of CPE devices 110 is initiated by the CPE data retrieval system 102 on a periodic basis. Responsive to the trigger event, the CPE data collection module 204 issues a command to the communication module 201 to establish parallel communication channels between the CPE data retrieval system 102 and each of the plurality of CPE devices 110 in the CPE data retrieval system 102. The CPE data collection module 204 issues requests for a bulk download of CPE data to each of the plurality of CPE devices 110 via the parallel communication channels. Each of the plurality of CPE devices 110 responsively retrieves the CPE data stored in each of the respective CPE devices 110 and transmits the CPE data to the CPE data retrieval system 102. In one embodiment, the CPE data collection module 204 archives the CPE data that is collected during the bulk download of CPE data in the CPE data database 208. In one embodiment, the CPE data collection module 204 maintains the CPE data retrieved during the bulk download of CPE data in the CPE data database 208 for a pre-defined period of time.

In one embodiment, the number of CPE devices 110 that the CPE data retrieval system 102 communicates with during a single CPE data retrieval session is defined by the CPE data retrieval system hardware, software and/or bandwidth limitations. In one embodiment, the number of CPE devices 110 that the CPE data retrieval system 102 communicates with during a single CPE data retrieval session ranges from a single CPE device 110 to as many as a thousand CPE devices 110. In one embodiment, it takes approximate one minute to perform a bulk download of the CPE data stored in a single CPE device 110 to the CPE data retrieval system 102.

In one embodiment, the CPE devices 110 employ a Digital Subscriber Line (DSL) forum standard TR69 tree data model to store CPE data. The DSL forum standard TR69 tree data model supports the retrieval of CPE data by the CPE data retrieval system 102 as individual data elements, as an individual data branch, or as a whole data tree. CPE data is typically retrieved from a CPE device 110 in the form of a whole data tree during a bulk download of CPE data from the CPE device 110.

It should be noted that the systems described above may be implemented using software or firmware executed by hardware, or exclusively in hardware through the use of one or more custom circuits, such as for example, application-specific integrated circuits (ASICs) or any other suitable combination of hardware and/or software.

Figure 5:
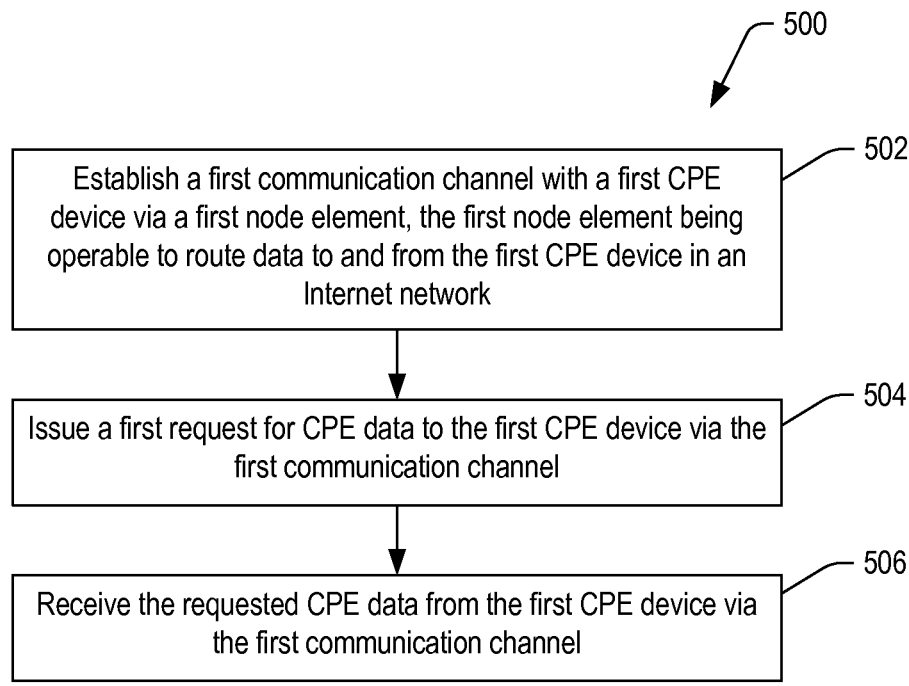
FIG. 5 is a flow chart of one embodiment of a method of retrieving CPE data.

Referring to FIG. 5, a flow chart of one embodiment of a method 500 of retrieving CPE data is shown. A first communication channel is established with a first CPE device 110 via a first node element 108 at step 502. The first node element 108 is operable to route data to and from the first CPE device 110 in an Internet network. A request for CPE data is issued to the first CPE device 110 via the first communication channel at step 504. The requested CPE data is received from the first CPE device 110 via the first communication channel at step 506. While the steps in the method 500 have been described in a particular order, the steps may be performed in a different order or additional steps may be performed in addition to the described steps.

In one embodiment, a computer readable medium stores a computer executable program for retrieving customer premise equipment (CPE) data. The computer readable medium includes computer readable code for establishing a first communication channel with a first CPE device 110 via a first node element 108, the first node element 108 being operable to route data to and from the first CPE device 110 in an Internet network, computer readable code for issuing a first request for CPE data to the first CPE device 110 via the first communication channel, and computer readable code for receiving the requested CPE data from the first CPE device 110 via the first communication channel.

In one embodiment, a system for retrieving customer premise equipment (CPE) data includes a communication module 201 and a CPE data collection module 204. The communication module 201 is operable to establish a first communication channel with a first CPE device 110 via a first node element 108, the first node element 108 being operable to route data to and from the first CPE device 110 in an Internet network. The CPE data collection module 204 is communicatively coupled to the communication module 201. The CPE data collection module 204 is operable to issue a first request for CPE data to the first CPE device 110 via the first communication channel and receive the requested CPE data from the first CPE device 110 via the first communication channel.

Figure 6:
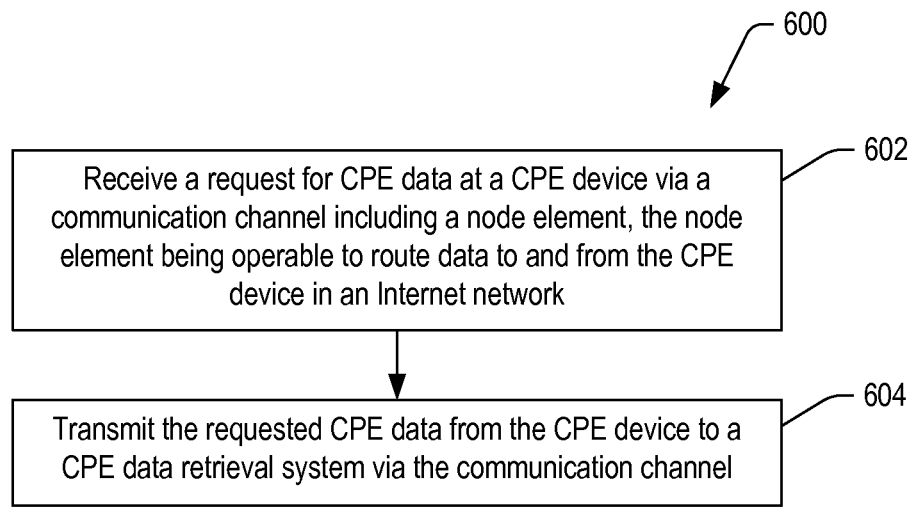
FIG. 6 is a flow chart of another embodiment of a method of retrieving CPE data.

Referring to FIG. 6, a flow chart of another embodiment of retrieving CPE data is shown. A request for CPE data is received at a CPE device 110 via a communication channel including a node element 108 at step 602. The node element 108 is operable to route data to and from the CPE device 110 in an Internet network. The requested CPE data is transmitted from the CPE device 110 to the CPE data retrieval system 102 via the communication channel at step 604. While the steps in the method 600 have been described in a particular order, the described steps may be performed in a different order, a subset of the described steps may be performed, or additional steps may be performed in addition to the described steps.

Figure 7:
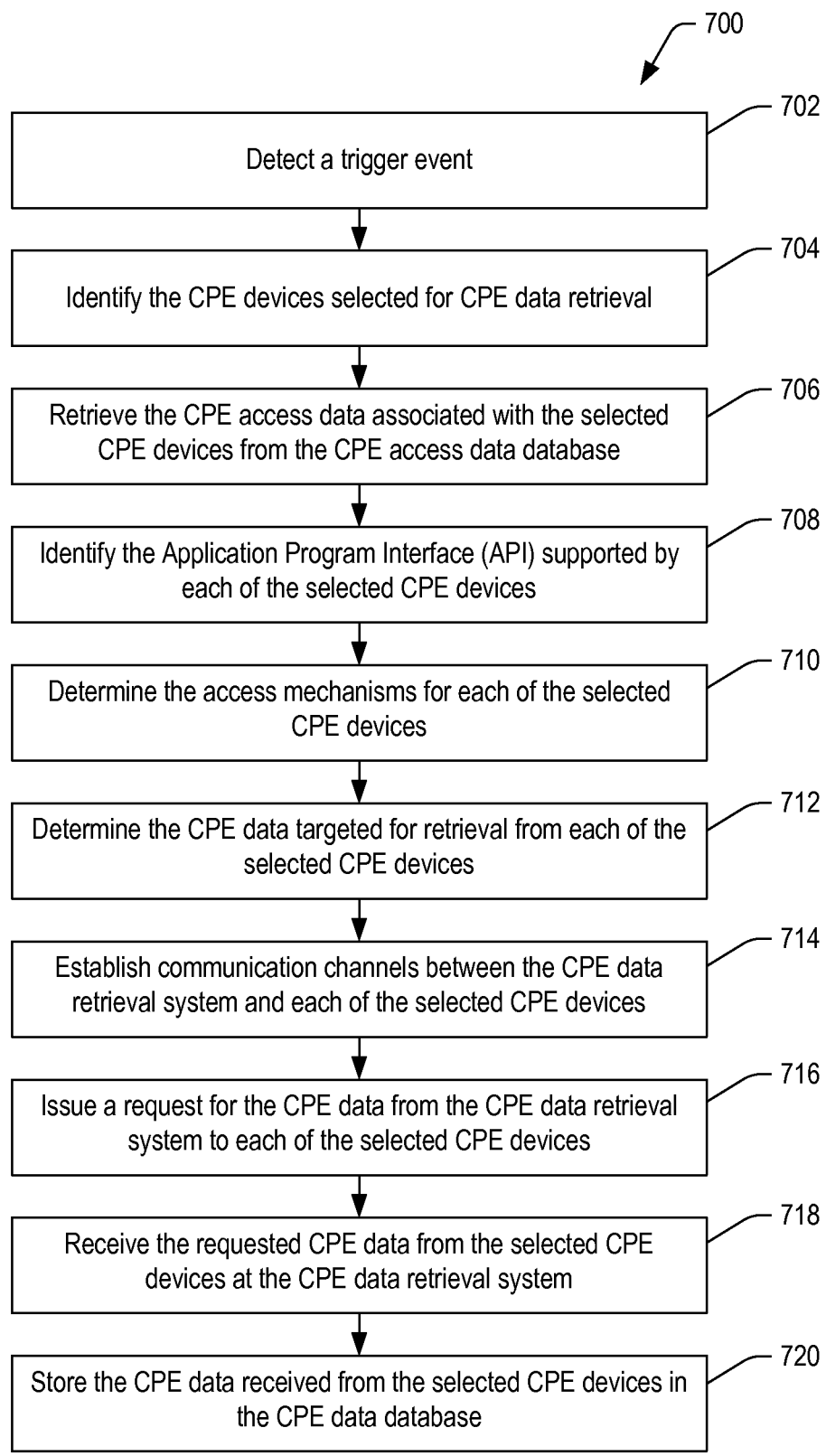
FIG. 7 is a flow chart of another embodiment of a method of retrieving CPE data.

Referring to FIG. 7, a flow chart of another embodiment of a method 700 of retrieving CPE data using a CPE data retrieval system 102 is shown. The CPE data collection module 204 detects a trigger event at step 702. The CPE data collection module 204 identifies the one or more CPE devices 110 that have been selected for CPE data retrieval based on an analysis of the trigger event at step 704 and retrieves the CPE access data for each of the one or more selected CPE devices 110 from the CPE access data database 206 at step 706. The CPE data collection module 204 reviews the CPE type of each of the selected one or more CPE devices 110 and to identify the specific API supported by each of the one or more selected CPE devices 110 at step 708 and to determine the appropriate access mechanisms for each of the one or more selected CPE devices 110 at step 710. The CPE data collection module 204 determines the CPE data targeted for retrieval from the one or more selected CPE devices 110 based on an analysis of the trigger event at step 712.

The CPE data collection module 204 issues a command to the communication module 201 to establish communication channels between the CPE data retrieval system 102 and each of the one or more selected CPE devices 110 using the CPE identification tag, the CPE access mechanism, and the CPE access certificate for each of the selected one or more CPE devices 110 and the communication module 201 establishes the requested communication channels at step 714. Each of the communication channels is established between the CPE data retrieval system 102 and each one of the respective selected CPE devices 110 via an associated node element 108 within the Internet network. The CPE data retrieval system 102 issues a request for the CPE data targeted for retrieval to each of the one or more selected CPE devices 110 via the respective communication channel at step 716. Each of the one or more selected CPE devices 110 responsively transmits the requested CPE data to the CPE data retrieval system 102. The requested CPE data is received from each of the selected one or more CPE devices 110 at the CPE data retrieval system 102 at step 718. The CPE data collection module 204 stores the CPE data received from the selected one or more CPE devices 110 in the CPE data database 208 at step 720.

While the steps in the method 700 have been described in a particular order, the described steps may be performed in a different order, a subset of the described steps may be performed, or additional steps may be performed in addition to the described steps.

Figure 8:
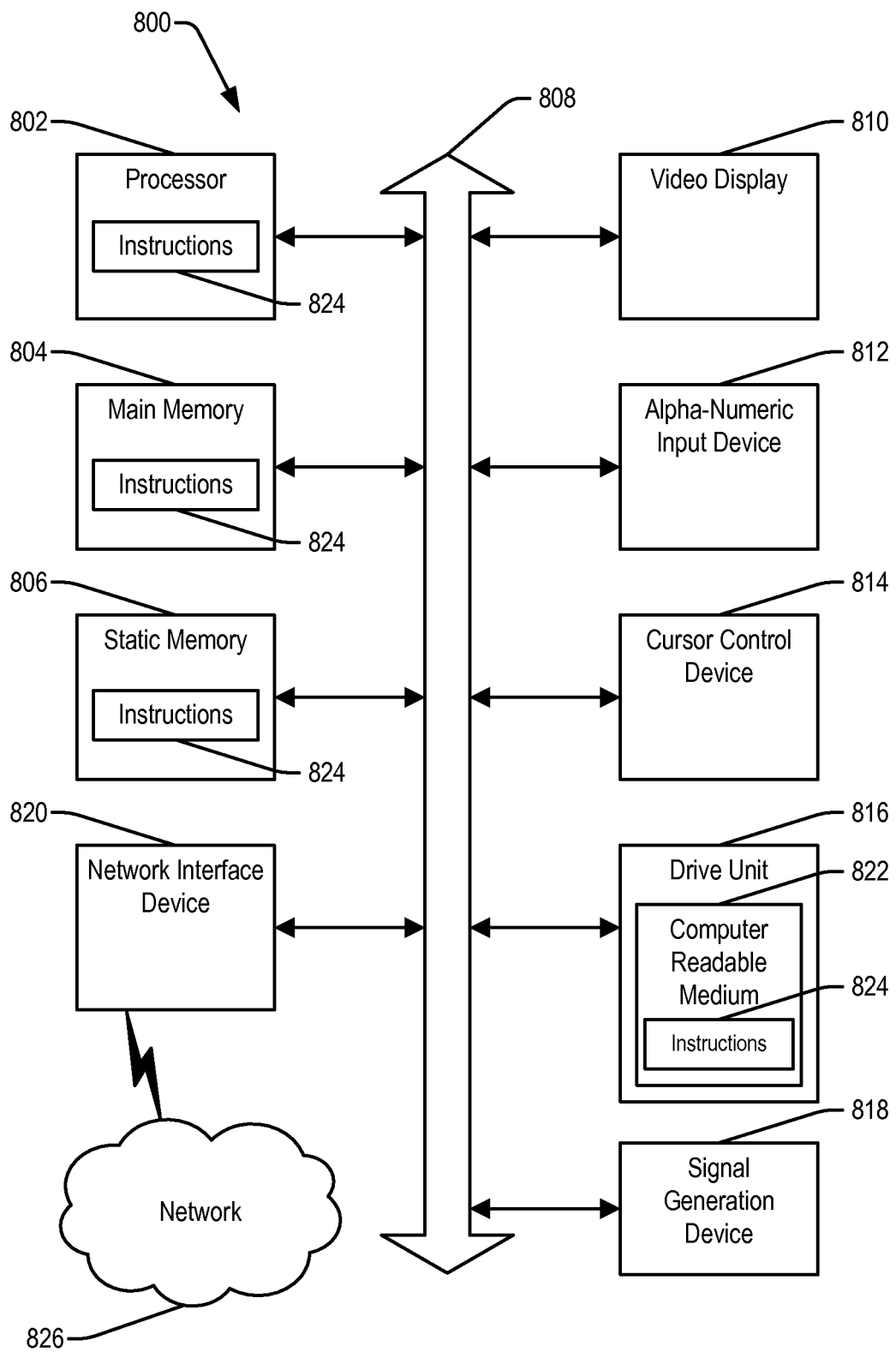
FIG. 8 is an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, a CPE device 110, a CPE data retrieval system 102, a CMS 106, a service provider system 104, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824, or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   detecting, at a customer premise equipment management system, a trigger event associated with customer premise equipment data, the customer premise equipment data associated with a customer premise equipment device;
   selecting an application program interface based on the customer premise equipment data;
   initiating a connection to the customer premise equipment device via the application program interface in response to the trigger event; and
   sending, from the customer premise equipment management system, a customer premise equipment data request to the customer premise equipment device via the application program interface.

2. The method of claim 1, wherein the trigger event comprises a request for retrieval of the customer premise equipment data from the customer premise equipment device.

3. The method of claim 2, wherein the detecting of the trigger event includes receiving the request for retrieval at the customer premise equipment management system.

4. The method of claim 1, wherein the trigger event comprises a periodic request for retrieval of the customer premise equipment data from the customer premise equipment device, and wherein the trigger event is detected periodically based on the periodic request for retrieval.

5. The method of claim 1, further comprising receiving the customer premise equipment data in response to the sending of the customer premise equipment data request to the customer premise equipment device via the application program interface.

6. The method of claim 5, further comprising storing the customer premise equipment data in a customer premise equipment data database, wherein the customer premise equipment data includes customer premise equipment access data, wherein the customer premise equipment access data is stored in a customer premise equipment access database, and wherein the customer premise equipment access database and the customer premise equipment data database are stored at the customer premise equipment management system.

7. The method of claim 6, wherein the customer premise equipment access database and the customer premise equipment data database are distinct databases.

8. The method of claim 5, further comprising sending, from the customer premise equipment management system, the customer premise equipment data to a service provider system.

9. The method of claim 1, wherein the customer premise equipment device comprises a digital subscriber line modem, a media playback device, a residential gateway, or a combination thereof.

10. A computer-readable storage device storing instructions that, when executed by a processor, cause the processor to perform operations comprising:
    detecting a trigger event associated with customer premise equipment data, the customer premise equipment data associated with a customer premise equipment device;
    selecting an application program interface based on the customer premise equipment data;
    initiating a connection to the customer premise equipment device via the application program interface in response to the trigger event; and
    sending a customer premise equipment data request to the customer premise equipment device via the application program interface.

11. The computer-readable storage device of claim 10, wherein sending the customer premise equipment data request includes:
    identifying an access mechanism for the customer premise equipment device based on the application program interface; and
    sending the customer premise equipment data to the customer premise equipment device based on the access mechanism.

12. The computer-readable storage device of claim 10, wherein the operations further comprise receiving the customer premise equipment data in response to the customer premise equipment data request.

13. The computer-readable storage device of claim 12, wherein the operations further comprise sending the customer premise equipment data to a service provider system.

14. The computer-readable storage device of claim 10, wherein the application program interface is supported by the customer premise equipment device.

15. A system comprising:
a processor; and
a memory coupled to the processor, the memory storing instructions that, when executed by the processor, cause the processor to perform operations including:
  detecting a trigger event associated with customer premise equipment data, the customer premise equipment data associated with a customer premise equipment device;
  selecting an application program interface based on the customer premise equipment data;
  initiating a connection to the customer premise equipment device via the application program interface in response to the trigger event; and
  sending a customer premise equipment data request to the customer premise equipment device via the application program interface.

16. The system of claim 15, wherein the initiating of the connection includes establishing the connection via a node element coupled to the customer premise equipment device.

17. The system of claim 16, wherein the node element is configured to route data over a wide area network.

18. The system of claim 15, wherein the trigger event is associated with a service maintenance procedure.

19. The system of claim 15, wherein the customer premise equipment data request is associated with bulk download of customer premise equipment data.

20. The system of claim 15, wherein the customer premise equipment data comprises local area network performance parameters, local area network usage parameters, local area network performance statistics, or a combination thereof.

* * * * *